(12) United States Patent
Geigel et al.

(10) Patent No.: US 10,394,799 B2
(45) Date of Patent: Aug. 27, 2019

(54) SYSTEM AND METHOD OF EXTRACTING DATA FROM STRUCTURED AND UNSTRUCTURED SOURCES OF DATA USING AUTOMATED JOINS

(71) Applicant: Atlantic Technical Organization, San Juan, PR (US)

(72) Inventors: Arturo Geigel, San Juan, PR (US); Victor Rivera, San Juan, PR (US)

(*) Notice: Subject to any disclaimer, the term of this patent is extended or adjusted under 35 U.S.C. 154(b) by 159 days.

(21) Appl. No.: 15/588,435

(22) Filed: May 5, 2017

(65) Prior Publication Data
US 2018/0322166 A1 Nov. 8, 2018

(51) Int. Cl.
| G06F 17/00 | (2019.01) |
| G06F 16/242 | (2019.01) |
| G01C 21/34 | (2006.01) |
| G06F 16/31 | (2019.01) |
| G06F 16/2455 | (2019.01) |
| G06F 16/2452 | (2019.01) |
| G06F 16/28 | (2019.01) |

(52) U.S. Cl.
CPC ..... *G06F 16/2423* (2019.01); *G01C 21/3446* (2013.01); *G06F 16/2428* (2019.01); *G06F 16/2456* (2019.01); *G06F 16/24526* (2019.01); *G06F 16/322* (2019.01); *G06F 16/284* (2019.01)

(58) Field of Classification Search
CPC .............. G06F 19/00; G06F 17/30377; G06F 17/3012; G06F 17/30424; G06F 17/30958
USPC .......................................................... 707/704
See application file for complete search history.

(56) References Cited

U.S. PATENT DOCUMENTS 5,701,460 A * 12/1997 Kaplan ............. G06F 17/30392
707/748

* cited by examiner

*Primary Examiner* — Truong V Vo
(74) *Attorney, Agent, or Firm* — Engenio J. Torres-Oyola; Victor M. Rodriguez-Reyes; Ferraiuoli LLC (57) ABSTRACT

System and method for creating enabling the user to select fields from a database, semi structured or unstructured documents that produces an automated process of joining the database tables, semi structured or unstructured documents into a feature vector that can be further processed by machine learning algorithms or preprocessing routines and filters. The full join performed starts by producing a graph representation of the links between data tables/documents and then restructuring the information into the most efficient join tree. The join tree then extracts the data in the form of a feature vector.

7 Claims, 11 Drawing Sheets

Figure 6 allergy_reaction
- allergy_reaction_id [UNIQUE] [int]
- 38 → allergy_reaction_id [PRIMARY KEY] [int]
- allergy_id [FOREIGN KEY] [int]
- reaction_concept_id [FOREIGN KEY] [int]
- 41 → uuid [] [char]
- reaction_non_coded [] [varchar]

39 → care_setting
- uuid [UNIQUE] [char]
- 40 → name [UNIQUE] [varchar]
- care_setting_id [PRIMARY KEY] [int]
- 41 → creator [FOREIGN KEY] [int]
- retired_by [FOREIGN KEY] [int]
- changed_by [FOREIGN KEY] [int]
- retired [] [tinyint]

SYSTEM AND METHOD OF EXTRACTING DATA FROM STRUCTURED AND UNSTRUCTURED SOURCES OF DATA USING AUTOMATED JOINS

STATEMENT REGARDING FEDERALLY SPONSORED RESEARCH AND DEVELOPMENT

N/A

RELATED APPLICATIONS

N/A

BACKGROUND OF THE INVENTION

Field of the Invention

The field of invention relates to the process of extracting relevant information from databases as well as unstructured and semi structured documents via joining relationships among entries of said databases and documents.

Discussion of the Background

The need to extract data to be processed by data mining and machine learning algorithm from structured and unstructured documents represents a challenge to a lay person that does not have the required skill set to construct SQL queries. The challenge is still more complex when the user is faced with the task of uniting semi structured and unstructured documents with relational tables and other documents. This problem is usually done manually or semi automatically by system administrators or highly skilled personnel and can be a time consuming task.

Prior art in this field has historically focused on automated generation of queries. The most relevant prior art relating to this field have been U.S. Pat. No. 5,701,460 A US 20120254153 A1 among others. The prior art has also focused on efficient joins that optimize the internal execution of the database engine.

The prior art fail to disclose a system and process that can join N tables as a complete set as opposed to efficiently in a relational database and also for the case where the data is unstructured or semi structured. For the relational database the prior art has disclosed the case where the information is to be tied among two vertices's in a graph. This solution does not translate into a join that can be executed in an N join situation since the "joining of joins" using the shortest path might not translate into a complete join therefore being unable to guarantee that all joins are optimal under cases where selection of multiple tables might have other optimal outcomes. The reason for the incompleteness stems from cases where intermediate tables imposes constraints on the joins making them loose the commutative and associative properties that simple outer joins have. Full outer joins are necessary to guarantee that an automated system extracts all the information that a user wants without imposing assumptions that will delete entries because of optimization steps by using Dijkstra's algorithm. While the problem of all pairs shortest path is to determine the shortest path among all nodes, the present problem can be framed as the shortest path among all nodes which can be used to compute a join operation that extracts the most complete set of data upon the constraints of multiple intermediate tables and the tables that contain the chosen fields. The translation of current art to the last framed problem is not obvious to someone skilled in the art.

SUMMARY OF THE INVENTION

The present invention overcomes the limitations of the Prior art to determine the shortest path among all nodes, the present problem can be framed as the shortest path among all nodes which can be used to compute a join operation that extracts the most complete set of data upon the constraints of multiple intermediate tables and the tables that contain the chosen fields. The disclosed invention allows for the analysis of complex data relationships and finding optimal selection of routes to join relational data for further analysis. The analysis carried out by the process can be scaled to N number of tables that require the intervention of an automated system to handle the complexity of the analysis. As the number of tables grow the number of paths that need to be computed to determine the optimal path becomes too complex for manual intervention. The process of the disclosed invention constitute an optimization of the data based on the analysis of the database tables assigning them weights so that the process can select the best available path that selects the most complete set on which to join the data Therefore, one of the objectives of the present invention is to improve the field of database extraction specifically the method of joining data in accordance with the principle of the present invention.

Another object of the invention is to apply principles of relational data to semi structured and unstructured documents in accordance with the principle of the present invention.

Another object of the invention is to create optimal paths using data from relational databases and its relations which are converted into graphs and then trees in accordance with the principle of the present invention.

Another object of the invention is create optimal paths using data and its relations from semi structured and unstructured documents which are converted into graphs and then trees respectively in accordance with the principle of the present invention.

The invention itself, both as to its configuration and its mode of operation will be best understood, and additional objects and advantages thereof will become apparent, by the following detailed description of a preferred embodiment taken in conjunction with the accompanying drawing.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying drawings, which are incorporated herein, constitute part of the specifications and illustrate the preferred embodiment of the invention.

DESCRIPTION OF THE PREFERRED EMBODIMENT

Those with skill in the computing arts will recognize that the disclosed embodiments have relevance to a wide variety of applications and architectures in addition to those described below. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

Figure 1:
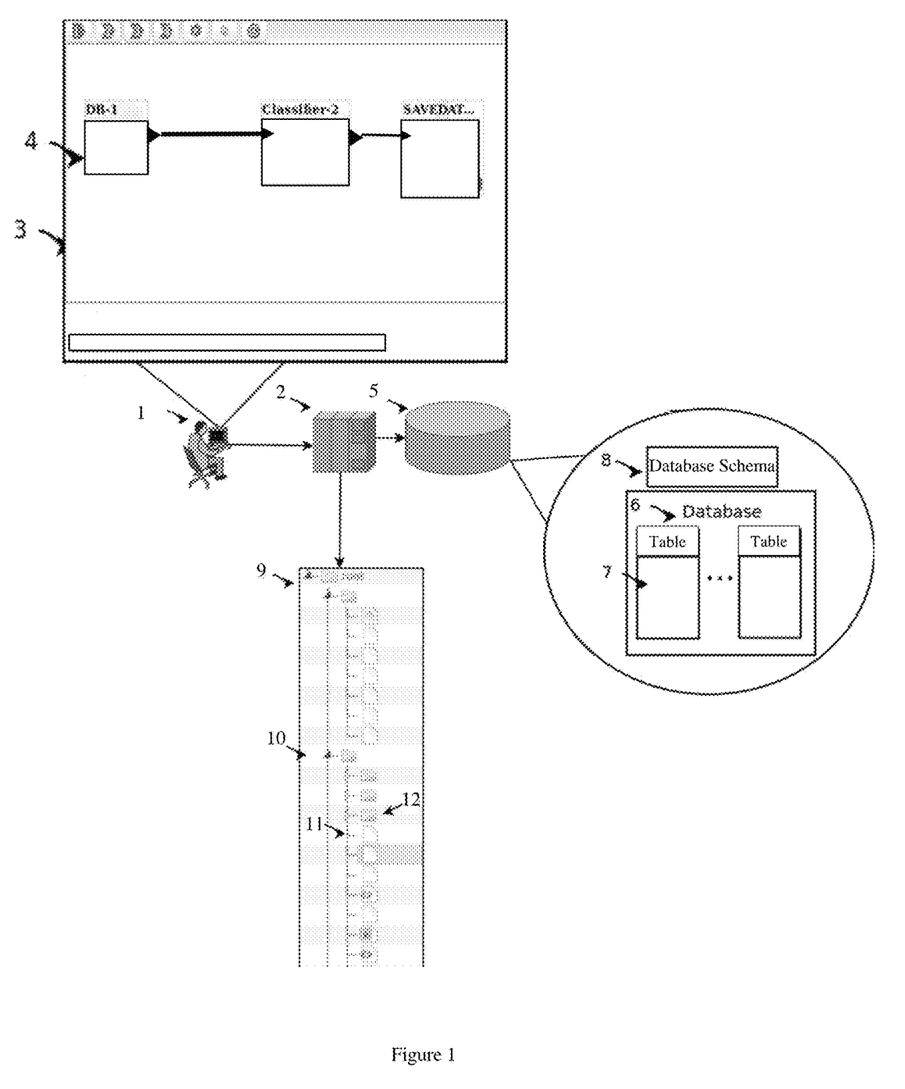
FIG. 1 shows a typical embodiment of the actual system that performs the functions in accordance with the principles of the present invention.

An exemplary computing system for implementing the embodiments and includes a general purpose computing device in the form of a computer 1. Components of the computer 1 may include, but are not limited to, a processing unit, a system memory, and a system bus that couples various system components including the system memory to the processing unit. The system bus may be any of several types of bus structures including, but not limited to, a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The computer 1 typically includes a variety of computer readable media. Computer readable media can be any available media that can be accessed by the computer 1 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory includes computer storage media in the form of volatile and/or nonvolatile memory such as read only memory (ROM) and random access memory (RAM). A basic input/output system (BIOS), containing the basic routines that help to transfer information between elements within computer 1, such as during start-up, is typically stored in ROM. RAM typically contains data and/or program modules that are immediately accessible to and/or presently being operated on by processing unit. By way of example, and not limitation, FIG. 1 illustrates operating system 1, central processing system 2, and data base.

The computer 1 and central processing system 2 may also include other removable/non-removable, volatile/nonvolatile computer storage media. The computer 1 and central processing system 2 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, or the like. The hard disk drive is typically connected to the system bus through a non-removable memory interface such as interface, and magnetic disk drive and optical disk drive are typically connected to the system bus by a removable memory interface, such as interface.

The drives and their associated computer storage media, discussed above, provide storage of computer readable instructions, data structures, program modules and other data for the computer 1. A user may enter commands and information into the computer 1 through input devices such as a tablet or electronic digitizer, a microphone, a keyboard and pointing device, commonly referred to as a mouse, trackball or touch pad. Other input devices (not shown) may include a joystick, game pad, satellite dish, scanner, or the like. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device 1 is incorporated, such as in a tablet-type personal computer. In addition, computers such as the computing device 1 may also include other peripheral output devices such as speakers and printer, which may be connected through an output peripheral interface or the like. A display device, for purposes of this patent application can include an e-paper display, a liquid crystal display or the like.

The computer 1 may operate in a networked environment using logical connections to one or more remote computers, such as a remote computer. The remote computer may be a personal computer, a server, a router, a network PC, a peer device or other common network node, and typically includes many or all of the elements described above relative to the computer. The logical connections depicted in FIG. 1 include a local area network (LAN) and a wide area network (WAN), but may also include other networks. Such networking environments are commonplace in offices, enterprise-wide computer networks, intranets and the Internet. For example, in the subject matter of the present application, the computer system 1 may comprise the source machine from which data is being migrated, and the remote computer may comprise the destination machine. Note however that source and destination machines need not be connected by a network or any other means, but instead, data may be migrated via any media capable of being written by the source platform and read by the destination platform or platforms. When used in a LAN or WLAN networking environment, the computer 1 is connected to the LAN through a network interface or adapter. When used in a WAN networking environment, the computer 1 typically includes a modem or other means for establishing communications over the WAN, such as the Internet. The modem, which may be internal or external, may be connected to the system bus via the user input interface or other appropriate mechanism. In a networked environment, program modules depicted relative to the computer 1, or portions thereof, may be stored in the remote memory storage device. By way of example, remote application programs may reside on memory device. It will be appreciated that the network connections shown are exemplary and other means of establishing a communications link between the computers may be used.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware.

A wireless network appropriate for some embodiments herein is shown in FIG. 1. The wireless network includes a computer or base station 1, which can be coupled to a central processing system or server 2. Base station 1 interacts with a plurality of wireless components, which may be receivers only (or with receive and transmit capability), designed to receive real time images and associated data as correlated and transmitted by server 2. Components interact with base station 1 via wireless connection. The wireless connection could include cellular modems, a radio-frequency (RF) methods and/or wireless local area network (WLAN). A wireless connection may include a portion of the route between the endpoints transmitted via a wired line, e.g. a fiber Internet backbone or an internal wired network coupling the server with wireless transmission hardware or base station.

Furthermore, FIG. 1 shows a typical embodiment of the actual system that performs the functions of the proposed invention. The system is accessed by a user through a terminal 1. The terminal 1 is connected to a central processing system 2 that contains memory components and processing units. The terminal accesses the functionality of the of the central processing system via an interface system 3 that has functionality icons 4. The central processing system 2 has or is connected to a database storage 5. The database storage 5 contains a database 6 that uses a database schema to store meta information of the stored database. A table 7 stored in database 6 stores the application information. The central processing system 2 can also have a structured and unstructured data source collection 9. The structured and unstructured data source collection 9 is composed of directories 10 files 11 and subdirectories 12 that may contain more files 11 and subdirectories 12.

Figure 2:
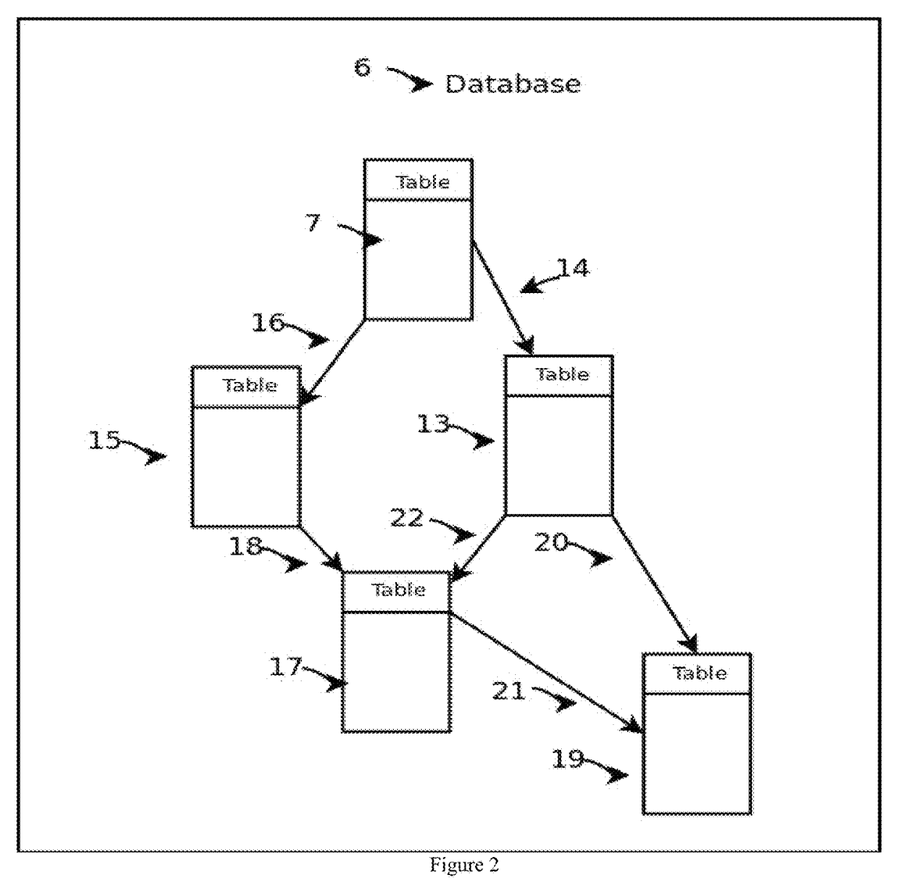
FIG. 2 Illustrates provides a representative example of a table relationship in accordance with the principles of the present invention.

FIG. 2 illustrates an example of a table relationship. A user selected table 7 that is contained in database 6 can be connected to a table 13 via a foreign key relationship 14. Table 7 can be connected to a table 15 via a foreign key relationship 16. Table 15 in turn is connected to table 17 via a foreign key relationship 18. Table 13 is connected to a user selected table 19 via a foreign key relationship 20. Table 17 is connected to user selected table 19 via a foreign key relationship 21 and finally table 13 is connected to table 17 through a foreign key relationship 22.

Figure 3:
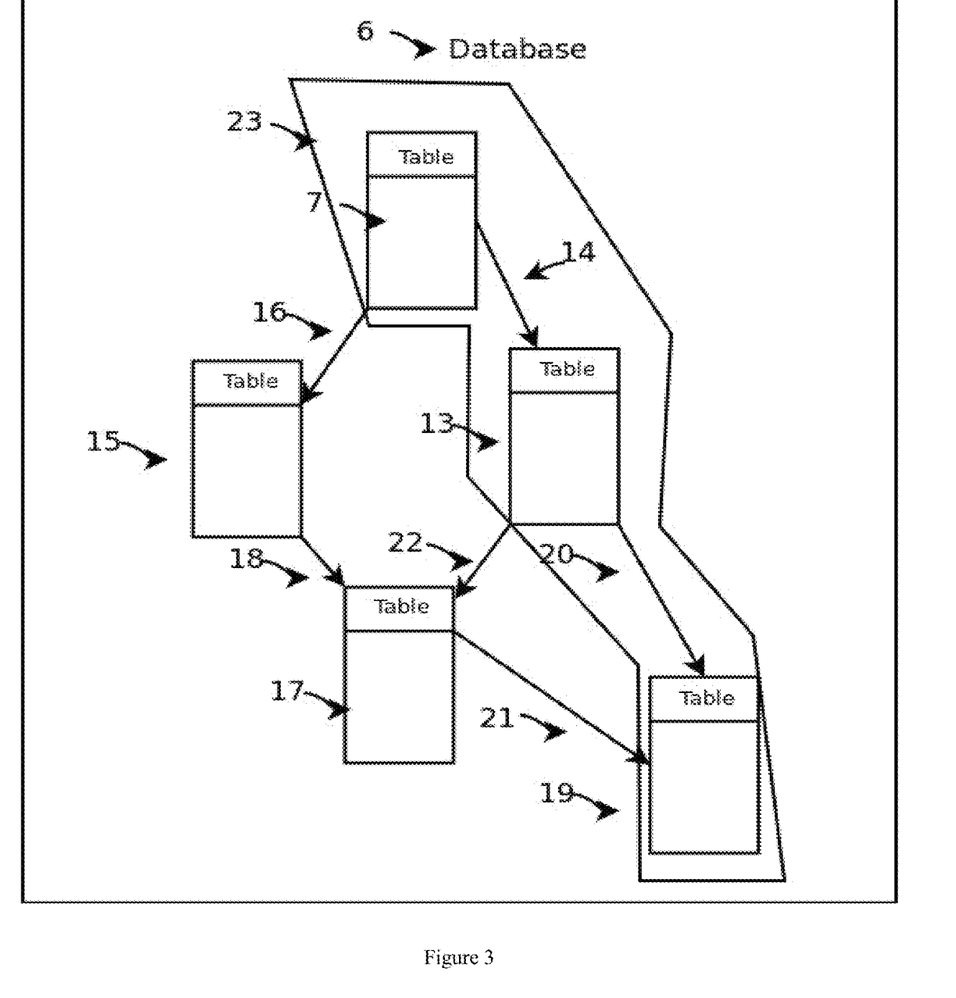
FIG. 3 Highlights a subset of table relationships from FIG. 2. using Djikstra in accordance with the principles of the present invention.

FIG. 3 Highlights a subset of table relationships from FIG. 2. produced by breadth first search or Dijkstra algorithm using equal weights on all nodes that makes a path between tables 23 that determines the shortest path between user selected table 7 and user selected table 19. The path between tables 23 consists of foreign key relationship 14 connecting user selected table 7 with 13 and table 13 is connected to user selected table 19 via a foreign key relationship 20.

Figure 4:
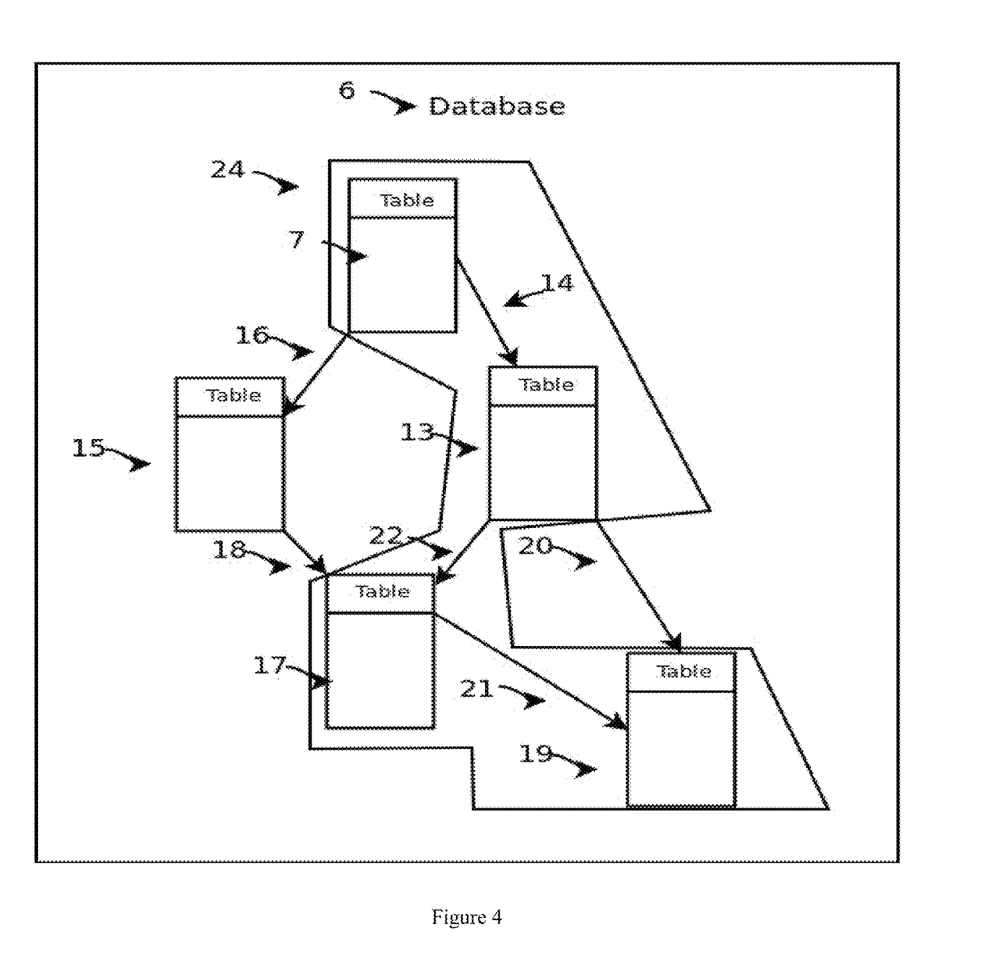
FIG. 4 Highlights a second subset of table relationships from FIG. 2 in accordance with the principles of the present invention.

FIG. 4 Highlights a second subset of table relationships from FIG. 2. A second path between tables 24 shows an alternate path that can be implemented to connect the user selected table 7 with user selected table 19. The path connects table 13 through a foreign key relationship 22 to table 17 and from table 17 to user selected table 19 through foreign key relationship 21.

Figure 5:
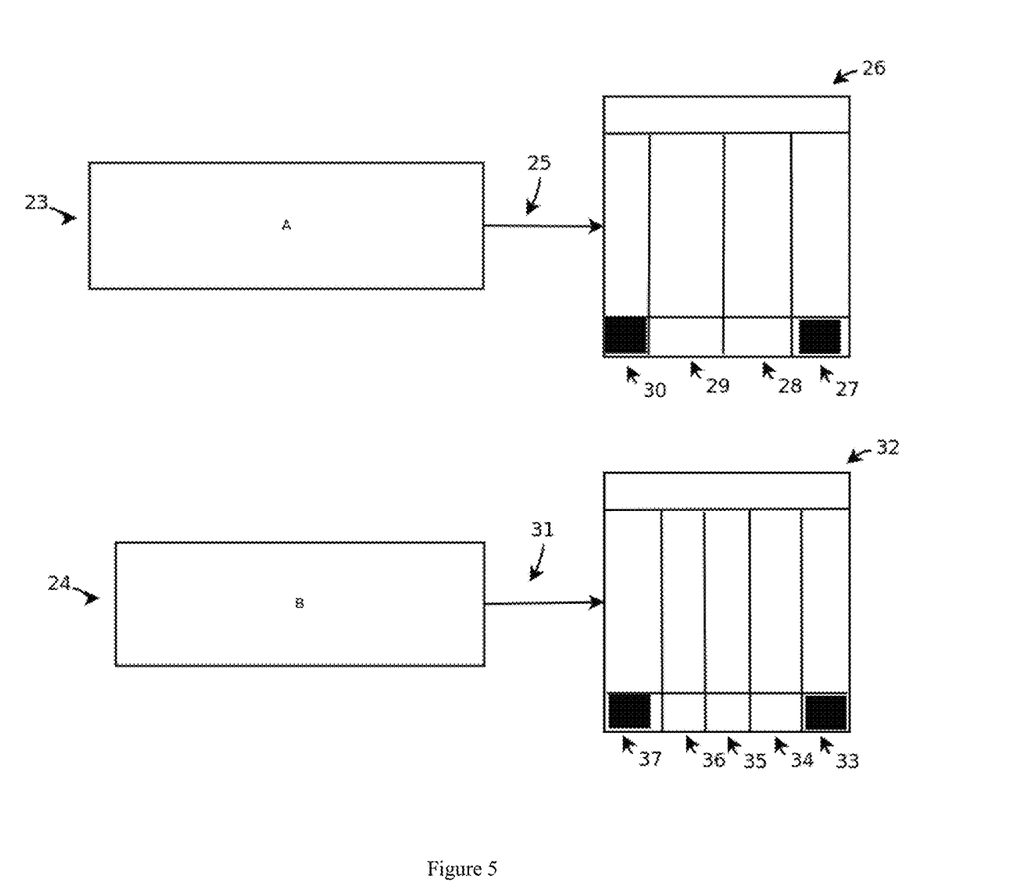
FIG. 5 Represents the subsets of FIG. 3 and FIG. 4 and their corresponding joins in accordance with the principles of the present invention.

FIG. 5 Represents the subsets of FIG. 3 and FIG. 4 and their corresponding joins. The path between tables 23 is used in performing a full outer join operation 25 on the user selected table 7 to connect it with user selected table 19. A graphical representation 26 of join operation 25 on path between tables 23 is shown uniting the user selected table 7 that includes a user selected column 27 with a foreign key column 28 representing foreign key relationship 14. A foreign key relationship column 29 representing foreign key relationship 20 is besides foreign key relationship column 28. Finally, foreign key relationship column 29 is besides a user selected column 30 of user selected table 19. Alternatively, path 24 is used to carry out a full outer join on the user selected table 7 to connect it with user selected table 19. A graphical representation 32 of join operation 31 of path between tables 24 is shown connecting a user selected column 33 from user selected table 7 with a column 34 representing foreign key relationship 14. Column 34 is connected to a foreign key column 35 representing foreign key relationship 22 which in turn is connected to a foreign key column 36 representing foreign key relationship 21. Finally, foreign key column 36 is connected to a user selected column 37 that represents table 19. The graphical representation 26 that uses the shortest path does not necessarily imply that it will get the same set result as graphical representation 32. The current disclosure addresses the required process to obtain the necessary conditions to obtain graphical representation 32 that represent a complete full outer join instead of graphical representation 26 that can result in a partial return of information in its full outer join.

Figure 6:
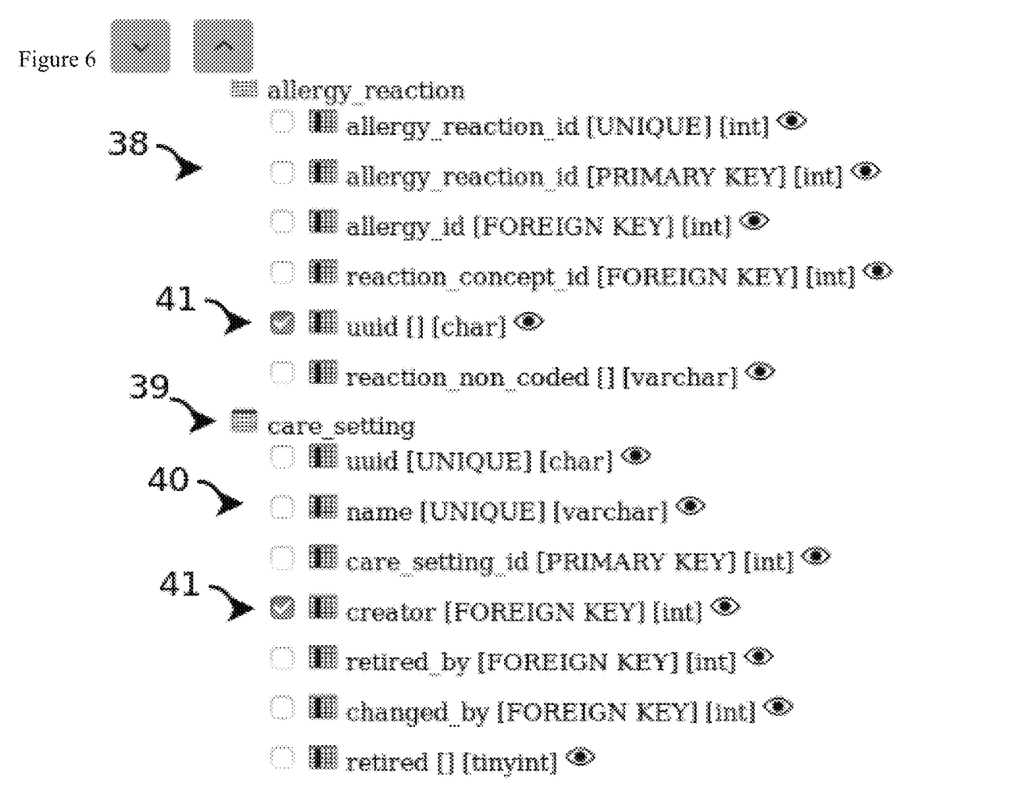
FIG. 6 Shows a graphical user display of database table fields for user selection in accordance with the principles of the present invention.

FIG. 6 Shows a graphical user display of database table fields for user selection. A user displays 38 presents to the user a table 39 containing a column 40. The user can use the interface to mark a selected column 41 from table 39 to start the extraction process.

Figure 7:
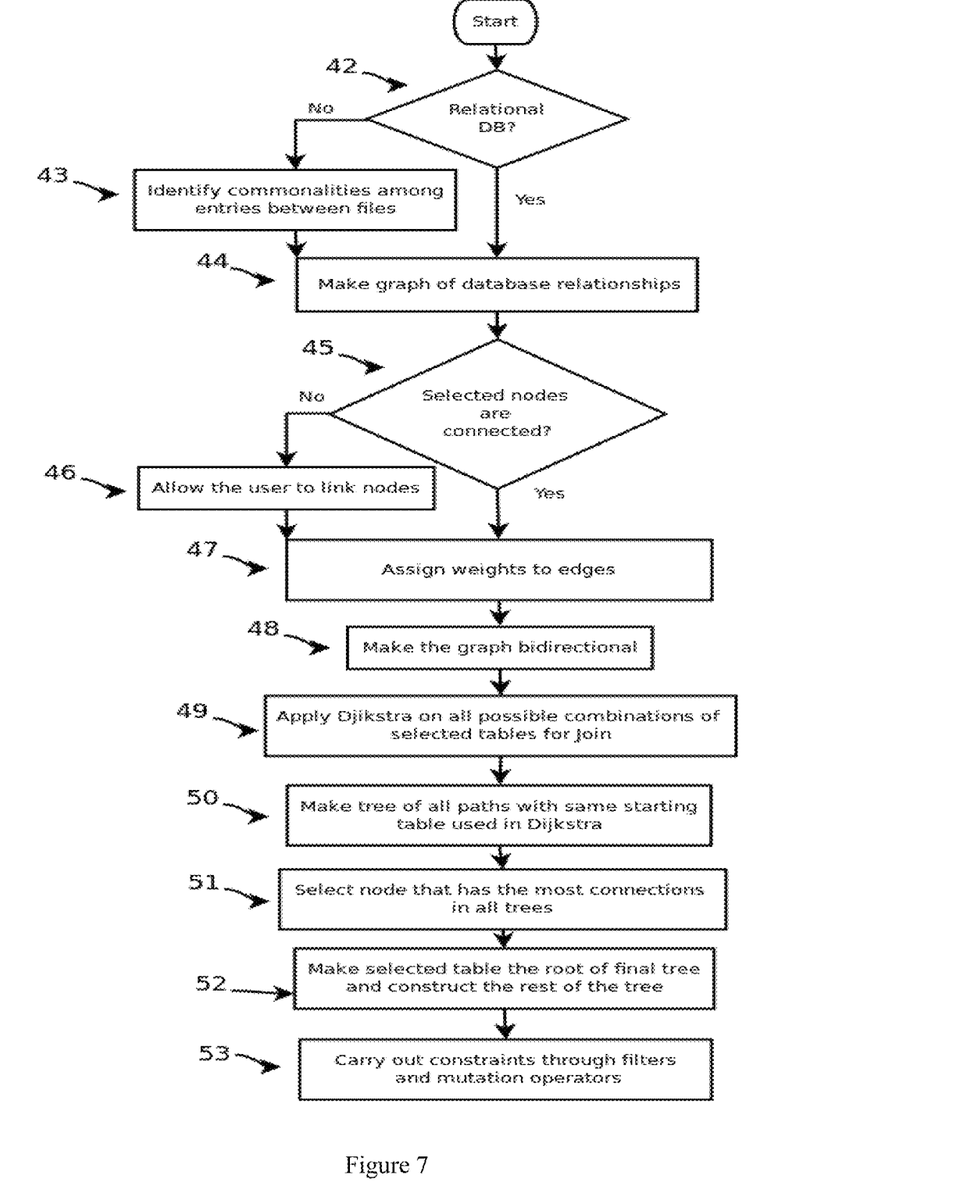
FIG. 7 Shows a block diagram of the main parts of the table graph processing and tree generation of the proposed system in accordance with the principles of the present invention.

FIG. 7 Shows a block diagram of the main parts of the table graph processing and tree generation of the proposed system. The algorithm starts with a step 42 that identifies whether the source document is a relational database or not. If the process turns out that the source is not relational then the process continues to a step 43. The step 43 allows the user to select commonalities between files that will be treated as foreign and primary keys to extract the data. The commonalities ca be straightforward word matches to particular regular expression patterns. Steps 42 and step 43 are followed by a step 44 that makes a graph of the data sources by using document/table entries as graph nodes and primary key/foreign key relationship entries as edges of the graph. A step 45 takes as input the graph made in step 44 and analyzes the graph to determine if the nodes of the graph are connected or not. This creates a decision process that if it is negative branches into a step 46 that allows the user to assign links to the unconnected vertices of the graph. This can be in the form of a process similar to step 43. The process continues with a step 47 that assigns weights to the edges of the graph. In a possible embodiment the step 47 can assign weights to edges based on source table number of foreign keys, number of times the primary key is called as a foreign key. additional weight can be assigned to the foreign keys based on the properties of the path connectivity, and the longest sequence that connects two or more selected edges. The weights of the edges are assigned based on the source vertex making any graph generated by the algorithm directed. Step 47 is followed by a step 48 where the process makes the graph bidirectional by taking into account the destination as source in the relationship making the graph in both directions. A step 49 applies Dijkstra to the graph output of step 48 on all combinations of endpoints of selected nodes that represent selected column 41 or its un structured/semi structured analogue of step 42 to step 45. A step 50 merges all runs of step 49 from a single source of Dijkstra's algorithm run to all its destinations to make a tree that has the source node as the root of the tree. Following step 50 is step 51 that selects the node that has the most connections amongst all trees processed in step 50. Step 52 uses the selected in step 51 from which a final composite tree is built that merges all trees made during step 50. The final step 53 applies further processing constraints to the output tree of step 52. The processing constraints can be in the form of post processing filters or even tree mutation operators to optimize the tree shape for efficient extraction of the endpoints that should be the leaves of the tree constructed in step 52.

Figure 8:
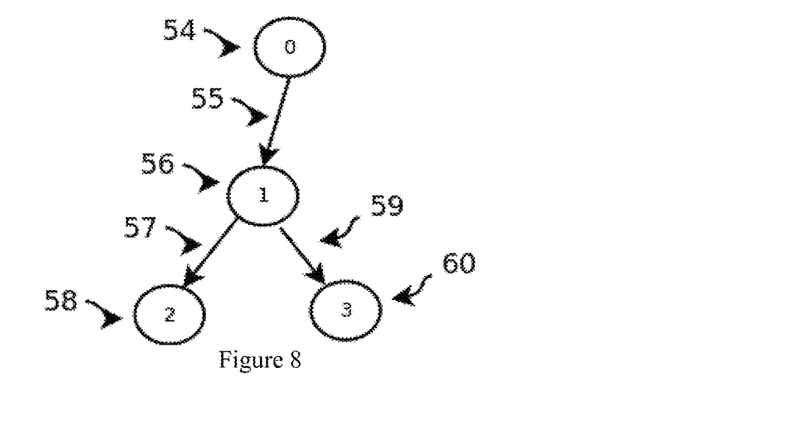
FIG. 8 Provides an illustration of a simple tree generated by the proposed process of the system in accordance with the principles of the present invention FIG. 9 Provides a second illustration of a simple tree generated by the proposed process of the system in accordance with the principles of the present invention.

FIG. 8 Provides an illustration of a simple tree generated by the proposed process of the system. FIG. 8 shows the tree constructed from step 50. A node 54 that represents 1 of three selected nodes is chosen as the starting node. An edge 55 links node 54 with a node 56 that is an intermediate node. The node 56 is connected by an edge 57 to a node 58 and finally node 56 is connected by an edge 59 to a node 60. The narrative represents a possible join between tables 0, 2 and 3 with 0 as starting point. This would translate into a path found by Dijkstra of path from 0 to 1 to 2 and path to from 0 to 1 to 3.

Figure 9:
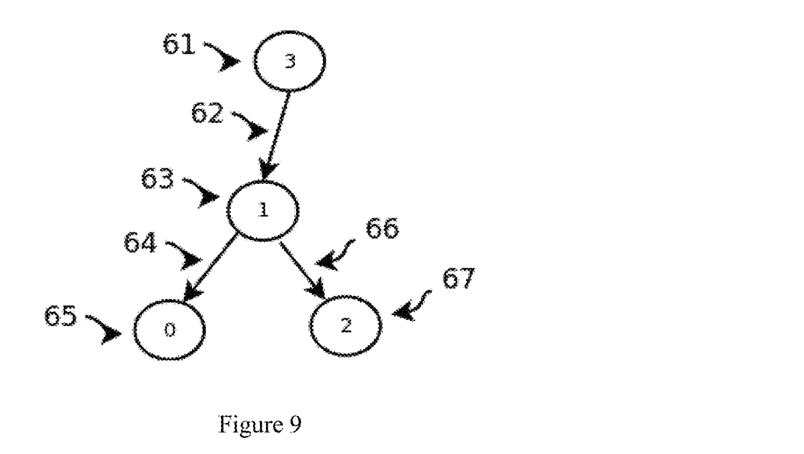

FIG. 9 Provides a second illustration of a simple tree generated by the proposed process of the system. FIG. 9 shows the second tree constructed from step 50. A node 61 that again represents 1 of three selected nodes is chosen as the starting node. An edge 62 links node 61 with a node 63 that is an intermediate node. The node 63 is connected by an edge 64 to a node 65 and finally node 63 is connected by an edge 66 to a node 67. The narrative represents the possible join between tables 0, 2 and 3 with 3 as starting point. This would translate into a path found by Dijkstra of path from 3 to 1 to 0 and path to from 3 to 1 to 2.

Figure 10:
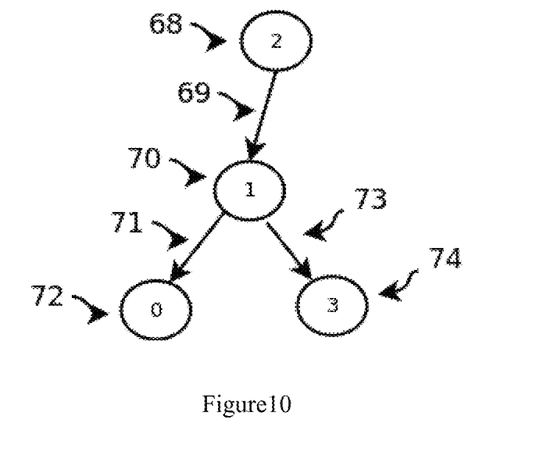
FIG. 10 Provides a third illustration of a simple tree generated by the proposed process of the system in accordance with the principles of the present invention.

FIG. 10 Provides a third illustration of a simple tree generated by the proposed process of the system. FIG. 10 shows the third tree constructed from step 50. A node 68 that again represents 1 of three selected nodes is chosen as the starting node. An edge 69 links node 68 with a node 70 that is an intermediate node. The node 70 is connected by an edge 71 to a node 72 and finally node 70 is connected by an edge 73 to a node 74. The narrative represents the possible join between tables 0, 2 and 3 with 2 as starting point. This would translate into a path found by Dijkstra of path from 2 to 1 to 0 and path to from 2 to 1 to 3.

Figure 11:
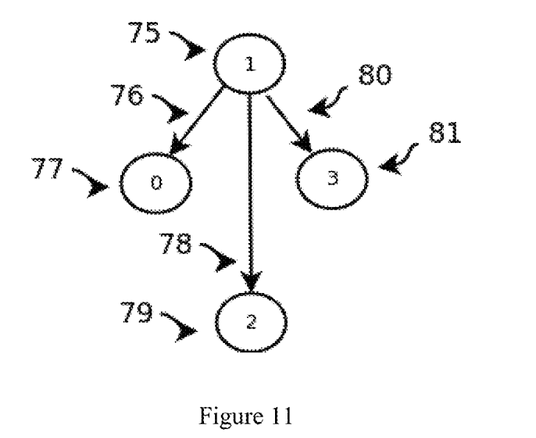
FIG. 11 provides the final tree derived from the three example trees generated by the proposed process of the system in accordance with the principles of the present invention.

FIG. 11 provides the final tree derived from the three example trees generated by the proposed process of the system. The nodes identified as node 56, 63 and 70 that appears in every one of the previous graphs is converted into a root node 75. From there it is linked via an edge 76 to node 77 an edge 78 to a node 79 and an edge 80 to a node 81. From this final tree the join operation is performed on the nodes 77, 79 and 81 representing selected column 41 always using the node 75 as link between the nodes.

Figure 12:
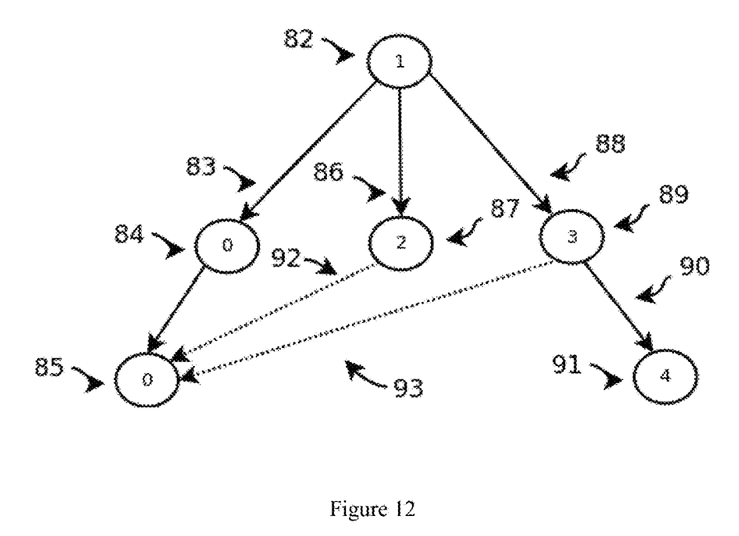
FIG. 12 provides a representation of a tree derived by the proposed process of the system in accordance with the principles of the present invention.

FIG. 12 provides a representation of a tree derived by the rules of the process. The tree in the diagram starts with a node 82 connected via a link 83 to node 84 that in turn is connected to a node 85. node 82 is connected via a node 86 to node 87. Additionally, node 82 is connected via a link 88 to a node 89 that in turn is connected via a link 90 to a node 91. The step 52 that constructs the tree imposes a constraint that would eliminate both a links 92 and a link 93. This rule allows only one parent per node but allows many children per node. The tree construction would disallow the join construction of node 85 with node 91 through link 93 that would entail the shortest optimal path to node 91 but is not the most complete representation of the data set.

Figure 13:
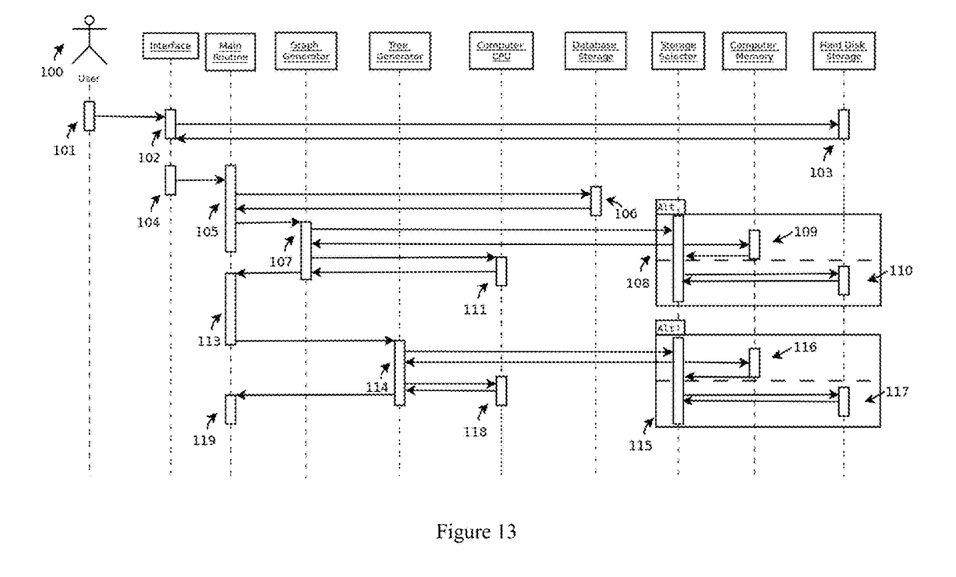
FIG. 13 provides an interaction representation between the process, storage and the hardware components of the system in accordance with the principles of the present invention.

FIG. 13 provides an interaction representation between the process, storage and the hardware components. A user 100 engages the with the application through an initial interaction 101 with an interface 102 on interface system 3. The Interface 102 corresponds to user display 38. Once the user configures the Interface 102, the configuration is saved by a save to disk action 103. Once the Action to save to disk 103 is finished a message is sent back to the interface 102. The interface 102 also initiates a process of communication 104 to a main routine 105. The main routing 105 triggers the communication with a databases storage process 106 that is in charge of extracting the information from database 6 located in database storage 5 or other storage such as structured and unstructured data source collection 9. The databases storage process 106 returns the fetched data to the main routine 105. The main routine 105 The main routine 105 passes the fetched information to a graph generation process 107. The graph generator 107 communicates with a storage selector process 108 that computes the size of the data and based on the calculation of size and additional constraints determines if it does the graph construction in a computer memory 109 or on a hard disk storage 110. The given embodiment is not limited to hard disk storage or computer memory but also disk media or other storage medium. The storage selector process 108 communicates the selected computing space to the graph generation process 107. The graph generation process 107 proceeds to generate a graph of the relationships among the database elements stored in database 6 using a computer CPU 111 and using either computer memory 109 or hard disk storage 110 according to the response given by storage selector process 108. The graph generation process 107 returns the results of the process to a main routine process 113. The main routine 113 passes the returned information to a tree generation process 114. The tree generator 114 communicates with a storage selector process 115 that computes the size of the data and based on the calculation of size and additional constraints determines if it does the tree construction in a computer memory 116 or on a hard disk storage 117. The given embodiment is not limited to hard disk storage or computer memory but also disk media or other storage medium. Further, the storage selector process for the tree generator does not need to reside on the same computer system as the storage selector process for the graph generator. The storage selector process 115 communicates the selected computing space to the tree generation process 114. The tree generation process 114 proceeds to generate a tree using a computer CPU processing 118 using either computer memory 116 or hard disk storage 117 according to the response given by storage selector process 115. The tree generation process 114 returns the results of the process to a main routine process 119 which can take further steps such as user notification or pass control to other applications for post processing.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

The invention claimed is:

1. A computer operable method to extract data from a database wherein said database includes a plurality of record sources and a plurality of relationships therebetween, said method comprising:
    selecting at least a first record source from among said plurality record sources in said database, wherein said first record source comprises at least a first foreign key relationship,
    selecting least a second record source from among said plurality record sources in said database, wherein said second record source comprises at least a second foreign key relationship;
    determining a path relationship based on the maximum amount of coverage between said first record source and said second record source among said plurality record sources, wherein said path includes a plurality of nodes, wherein a weight is assigned to each node,
    perform a full outer join operation on said first record source to connect said second record source;
    generating a graph of said full outer join operation defined by said first record source, said second record source and said path relationship among said plurality of record sources;
    and generating at least a first tree comprising a source node.

2. The method according to claim 1 comprising the step of selecting at least a first field, wherein said first field is at least one field from among said plurality record sources.

3. The method according to claim 1 wherein the step of selecting at least a first field comprises a graphical user display of database table fields for user selection.

4. A system, comprising:
    circuitry configured for displaying real time images and associated data, wherein said circuitry configured for displaying real time images and associated data comprises an interface system;
    circuitry configured for transferring an user request to a central processing system, wherein said central processing system is connected to a data base storage, wherein said data storage comprises a meta information;
    circuitry configured for selecting at least a first record source from among said plurality record sources in said database, wherein said first record source comprises at least a first foreign key relationship, circuitry configured for selecting least a second record source from among said plurality record sources in said database, wherein said second record source comprises at least a second foreign key relationship;

circuitry configured for determining at least a path relationship based on the maximum amount of coverage between said first record source and said second record source among said plurality record sources, wherein said path includes a plurality of nodes, wherein a weight is assigned to each node, circuitry configured for performing a full outer join operation on said first record source to connect said second record source;

circuitry configured for generating a graph of said full outer join operation defined by said first record source, said second record source and said path relationship among said plurality of record sources;

and circuitry configured for generating at least a first tree comprising a source node.

5. The system of claim 4, wherein said central processing system comprises a structured data source collection.

6. The system of claim 4, wherein said central processing system comprises a unstructured data source collection.

7. The system of claim 4, wherein said data storage comprises a database schema to store said meta information.

* * * * *